Patented June 27, 1933

1,916,090

UNITED STATES PATENT OFFICE

MAX WOELM, OF SPANGENBERG NEAR KASSEL, GERMANY

PROCESS FOR THE PRODUCTION OF MORPHINE SOLUTIONS

No Drawing. Application filed July 23, 1928, Serial No. 294,930, and in Germany May 2, 1927.

An application for patent has been filed in Germany on May 2, 1927.

It is a well-known fact that morphine solutions can not be injected without causing irritation. This is due to the fact that the hydrogen-ion concentration of a morphine solution (pH=about 5.2) tends to produce acidity. Now, it has been found that hydrochloric acid morphine solutions of the pH indicated above will permit the addition of such an amount of secondary sodium phosphate as to give said solutions the hydrogen-ion concentration of the blood, (about 7.2 to 7.5), without any separation of the base taking place.

Such solutions will remain clear for half-an-hour or longer, so that they can conveniently be injected, that is to say, used medically. The present invention has for its object a process which will enable morphine injections to be made wthout material irritation.

Since the hydrogen-ion concentration of these solutions, containing an addition of disodium phosphate as stated, tends to produce alkalinity, the morphine is converted into a lipoid-soluble condition, which also insures a more rapid action.

The ingredients or media to be used for the production of the solution are kept separate until the time of their intended use, and might be contained in individual bottles or flasks, but in practice I have found it more convenient to keep each of the ingredients in a separate compartment of the same receptacle. Flasks or receptacles having two separate compartments are well-known.

The morphine substance constituting one of the ingredients may be kept in its container or compartment either in a dry state, or as a morphine salt solution. In the latter case, I prefer to use a morphine salt solution containing a slight excess of the acid of such salt (for instance, if a chloride solution is used, a slight execess of hydrochloric acid would be employed), while as the other ingredient, I would prefer to employ an aqueous solution of disodium phosphate used in such amount as not only to neutralize the said slight excess of acid contained in the morphine solution, but to impart a slight alkalinity to the resulting liquid. This will insure a better preservation of the ingredients.

An example of my improved procedure is as follows: Using a two-compartment flask or receptacle of any well-known or approved construction (for instance, such as disclosed in U. S. Patents 1,570,346 and 1,592,632), I dissolve .02 milligrams of morphine in a solution a cubic centimetre of which contains .4 milligrams of disodium phosphate. By disodium phosphate is meant what is commonly known as pure disodium phosphate, or disodium phosphate free from the mono-sodium and trisodium salts. This morphine solution has a pH of from 6.8 to 7.2. This pH gives the solution a lipoid-soluble character, and also increases the rapidity of its action and avoids unpleasant effects. On the other hand, if sodium bicarbonate were used, .6 milligrams must be employed, that is to say, a greater amount than in the case of diphosphate, even though the molecular weight of sodium bicarbonate is smaller and it might therefore be expected that a smaller amount of such bicarbonate should be used. The explanation is probably found in the fact that a relatively large proportion of the bicarbonate is dissociated constantly into carbon dioxide and sodium carbonate. Since a neutral condition corresponds to a pH of 7.0, it follows that bringing the pH value of the solution to one corresponding to that of the blood (about 7.2 to 7.5) will give the solution a slightly alkaline character.

Having thus described my invention, what I claim as new and desire to secure by Letters Patent is:

Process for the production of morphine solutions suitable for injection, which consists in adding to a slightly acidified morphine salt, an amount of pure disodium phosphate sufficient to neutralize the acid of said morphine salt and also to impart to the resulting product an alkalinity corresponding to that of the blood.

In testimony whereof I affixed my signature.

MAX WOELM.